US009925945B2

(12) United States Patent
Yan et al.

(10) Patent No.: US 9,925,945 B2
(45) Date of Patent: Mar. 27, 2018

(54) AIRBAG ASSEMBLIES IN A VEHICLE

(71) Applicant: Ford Global Technologies, LLC, Dearborn, MI (US)

(72) Inventors: Sophie Yan, Nanjing (CN); Josh Zheng, Nanjing (CN); Daisy Zhao, Nanjing (CN); Laurence Yin, Nanjing (CN); Bob Wang, Nanjing (CN); Qingsong Ma, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,070

(22) Filed: Jan. 20, 2017

(65) Prior Publication Data

US 2017/0210330 A1  Jul. 27, 2017

(30) Foreign Application Priority Data

Jan. 25, 2016 (CN) .......................... 2016 1 0049455

(51) Int. Cl.
*B60R 21/217* (2011.01)
*B60R 21/205* (2011.01)

(52) U.S. Cl.
CPC .......... *B60R 21/217* (2013.01); *B60R 21/205* (2013.01); *B60R 2021/2177* (2013.01); *B60Y 2306/01* (2013.01); *B60Y 2306/09* (2013.01)

(58) Field of Classification Search
CPC .................................................. B60R 21/217
USPC ...................................................... 280/728.2
See application file for complete search history.

(56) References Cited

U.S. PATENT DOCUMENTS

| 7,234,724 | B1 | 6/2007 | Cowelchuk et al. |
| 7,290,790 | B2 | 11/2007 | Kielinen |
| 7,543,844 | B2 | 6/2009 | Rose et al. |
| 7,841,618 | B2* | 11/2010 | Idomoto ............... B60R 21/215 |
| | | | 280/728.3 |
| 8,459,688 | B2 | 6/2013 | Kim |
| 2004/0041370 | A1* | 3/2004 | Hier ..................... B60R 21/217 |
| | | | 280/728.2 |
| 2015/0033531 | A1 | 2/2015 | Kaphengst et al. |

FOREIGN PATENT DOCUMENTS

DE  102011089668 A1 *  4/2012 .......... B60R 21/217
KR  101560542  10/2015

* cited by examiner

*Primary Examiner* — Faye M Fleming
(74) *Attorney, Agent, or Firm* — Mohr IP Law Solutions, PC (57) ABSTRACT

An airbag assembly in a vehicle is provided. The airbag assembly comprises a base and a housing to be inserted into the base. The housing includes a first connection part protruding from an outer wall of the housing and a second connection part extending from the first connection part and facing the outer wall and the base includes a first slot extending in a first direction and a second slot extending from the first slot at a second direction different from the first direction, and the first slot includes an open end to receive the first connection part. The housing is connected with the base when first connection part is received in the second slot.

19 Claims, 5 Drawing Sheets

AIRBAG ASSEMBLIES IN A VEHICLE

RELATED APPLICATION

This application claims the benefit of Chinese Patent Application No.: CN 201610049455.1 filed on Jan. 25, 2016, the entire contents thereof being incorporated herein by reference.

FIELD OF INVENTION

The present application relates to airbag assemblies, in particular, relates to airbag assemblies used in a vehicle.

BACKGROUND OF INVENTION

For the convenience of replacement and maintenance, the parts in a vehicle are usually designed to be detachably connected with a vehicle panel. An airbag assembly is such an example of a vehicle part.

Current airbag assemblies usually comprise an installation base and a vehicles part. The installation base comprises a plurality of receiving slots, and the vehicle part comprises a plurality of elastic connection members corresponding to the plurality of the receiving slots. The connection member's free end has an extension disposed at a direction away from the vehicle parts. When the vehicle part is inserted into the installation base, the elastic connection member is deformed under a force until the extensions are pressed into the receiving slots. Such assembly needs sufficient force to clip or snap the vehicle part into its assembly position. Further, it is difficult to detach the vehicle part which is snap fitted with the installation base. Furthermore, due to a gap between the installation base and the vehicle part, a noise can be generated during the vehicle operation especially when driving on a bumpy road.

SUMMARY OF THE INVENTION

According to one aspect of the present disclosure, an airbag assembly in a vehicle is provided. The airbag assembly comprises a base and a housing to be inserted into the base. The housing includes a first connection part protruding from an outer wall, and a second connection part extending from the first connection part and facing the outer wall. The base includes a first slot extending in a first direction and a second slot extending from the first slot at a second direction different from the first direction.

In one embodiment, the second connection part extends from the first connection part along at the first direction.

In another embodiment, the base includes a surrounding wall across the two opposite ends of the first slot.

In another embodiment, the base and the enclosure are formed integrally.

In another embodiment, the first connection part is coupled to the second slot via transition fit.

In another embodiment, the second slot includes a protrusion to contact a surface of the first connection part.

In another embodiment, the second slot includes a protrusion to sandwich the first connection part between the protrusion and an inner end of the second slot.

In another embodiment, a length of the second slot at the second direction is greater than or equal to a distance between two opposite ends of the first slot.

In another embodiment, the base is configured to be at least a portion of an instrumental panel of the vehicle.

In another embodiment, the housing includes metal material and the base includes plastic.

According to another aspect, an airbag assembly in a vehicle comprises a housing including a first sidewall and at least one first connection part extending from an outer surface of the first sidewall and substantially perpendicular to the outer surface; and a base including a base plate and a first slot wall extending from the base plate, wherein the first slot wall extends from the base plate, substantially parallel to the first sidewall of the housing at an assemble position. The first slot wall includes a L-shaped slot having a first slot and a second slot and the first slot is configured to allow the first connection part of the housing to pass through during an assembling and disassembling processes. The housing is coupled to the base when the first connection part is received in the second slot after passing through the first slot.

In one embodiment, the housing further includes a second connection part disposed at a distal end of the first connection part and extending from a surface of the first connection part and facing the first sidewall.

In another embodiment, the housing further includes a second sidewall opposite to the first sidewall and the base further includes a second slot wall opposite to the first slot wall. The housing further includes a plurality of first and second connection parts on the first sidewall and the second sidewall, respectively. The base includes a plurality first and second slots corresponding to the plurality of first and second connection parts on the first slot wall and the second slot wall, respectively.

In another embodiment, the first slot is configured to allow the first connection part to pass through at a width direction of the first slot and the second slot is configured to enable transition fit, clearance fit or interference fit between the first connection part and the second slot.

In another embodiment, the base further includes a surrounding wall extending from an outer surface of the first sidewall and enclosing the first slot partially, and configured to allow the first and second connection parts to pass through.

In another embodiment, an inner wall of the second slot includes a protrusion to restrict movement of the first connection part once the first connection part is received in the second slot.

According to another aspect, an airbag assembly in a vehicle comprises a housing and a base. The housing includes a first sidewall and a second sidewall opposite each other, each of the first and second sidewalls include a first connection part extending from an outer surface of the first and second sidewall, respectively and substantially perpendicular to the outer surface. The base includes a base plate and a first slot wall and a second slot wall, the first and second slot walls extend from the base plate, and define an opening to receive the first and second sidewalls of the housing. The first and second slot walls include a L-shaped slot having a first slot and a second slot, the first slot is configured to allow the first connection part of the housing to pass through during an assembly process and a disassembly process. The housing is connected to the base when the first connection part is received in the second slot.

In one embodiment, the housing further includes second connection parts extending from a distal end of the first connection part, and substantially perpendicular with the first connection part. The second connection part is disposed outside the first and second slot walls of the base to restrict lateral movement of the housing.

In another embodiment, an inside wall of the second slot includes a protrusion to contact the first connection part to secure the first connection part in the second slot.

In another embodiment, the first and second sidewalls of the housing include a plurality of first connection parts and the first and second slot sidewalls include a plurality of corresponding L-shaped slot.

The airbag assembly of the present disclosure is advantageous at least at several aspects. The connection between a housing and a base of the airbag assembly is achieved via coupling of a first connection part and a second connection part with a second slot, which only needs an insertion of the first connection part into the first slot at the first direction and move the first connection part into the second slot along the second direction. Thus, it is easy to assemble and disassembly the housing to the base. In addition, a gap in the airbag assembly between the base and the housing can be minimized, which will avoid a noise when the vehicle has humping motion at some conditions.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed airbag assemblies will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various airbag assemblies are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
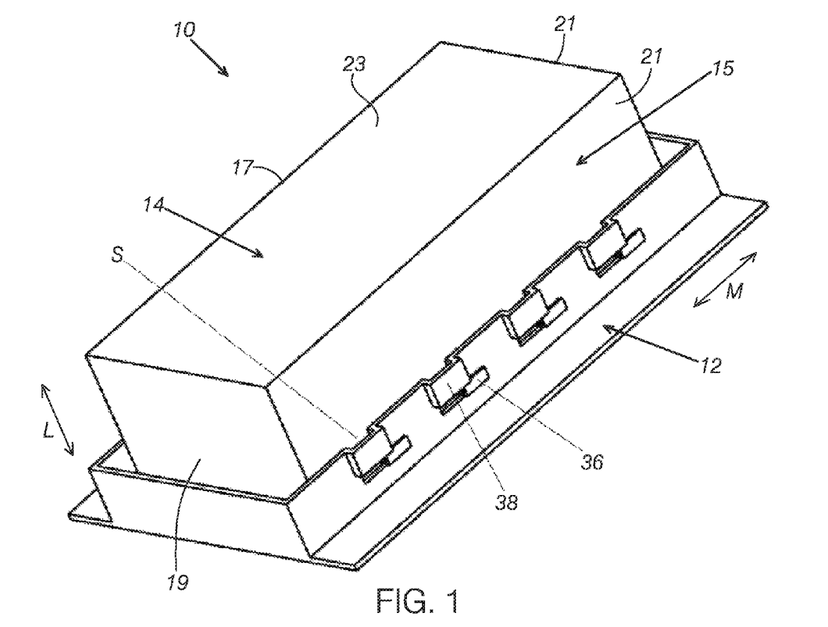
FIG. 1 is a perspective view of an airbag assembly according to one embodiment of the present disclosure, illustrating a connection of a base and a housing.

As shown in FIGS. 1 to 4, an example embodiment of an airbag assembly 10 according to the present disclosure is illustrated. Referring to FIG. 1 and FIGS. 2A-2B, the airbag assembly comprises a base 12 and a housing 14 capable of being inserted in the base 12. The housing 14 may include a first sidewall 15 and a second sidewall 17. The first sidewall 15 and the second sidewall 17 may also be referred to as outer walls in this application. In some embodiments, the housing 14 may further include a third sidewall 19, a fourth sidewall 21, and a top wall 23 to form a chamber. The first sidewall 15 may include a first connection part 26 protruding from an outer surface 11 of the first sidewall 15 of the housing 14. In some embodiments, the first sidewall 15 may further include a second connection part 36 extending from the first connection part 26 at distal end 25 and facing the outer surface 11 of the first sidewall 15. In the depicted embodiment shown in FIGS. 1 and 2A-2B, the second connection part 36 may be substantially perpendicular to the first connection part or substantially parallel to the outer surface 11 of the first sidewall 15. It should be understood that the second connection part 36 may be formed an angle with the first connection part 26.

Figure 2A:
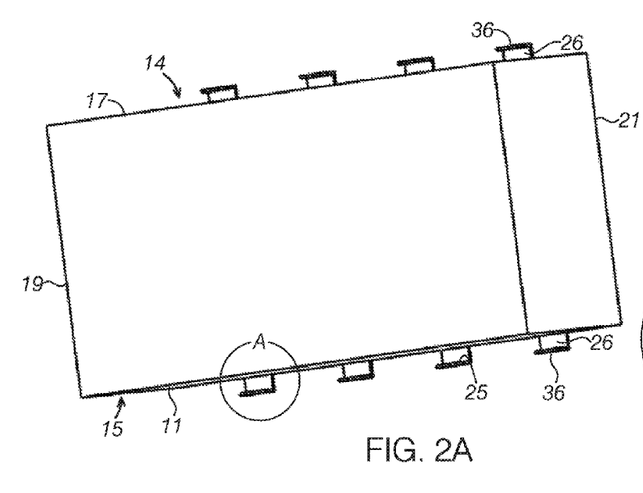
FIG. 2A is a perspective view of the housing of the airbag assembly in FIG. 1.

In some embodiments, the first sidewall 15 may include a plurality of first connection part 26. In some embodiments, the first sidewall 15 may include a plurality of first and second connection parts 26, 36.

Similarly, the second sidewall 17 may further include the first and second connection parts 26, 36. In some embodiments, the second sidewall 17 may include plurality of first and second connection parts 26, 36.

Figure 2B:
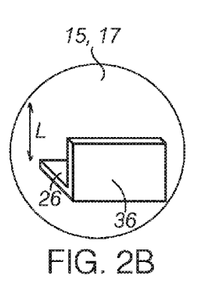
FIG. 2B is an enlarged view of a portion A depicted in FIG. 1.
Figure 3:
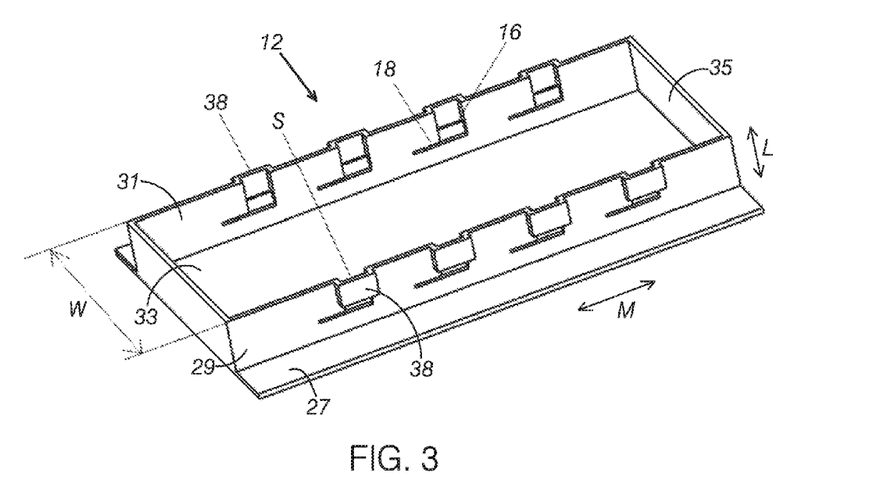
FIG. 3 is a perspective view of the base of the airbag assembly depicted in FIG. 1.
Figure 4:
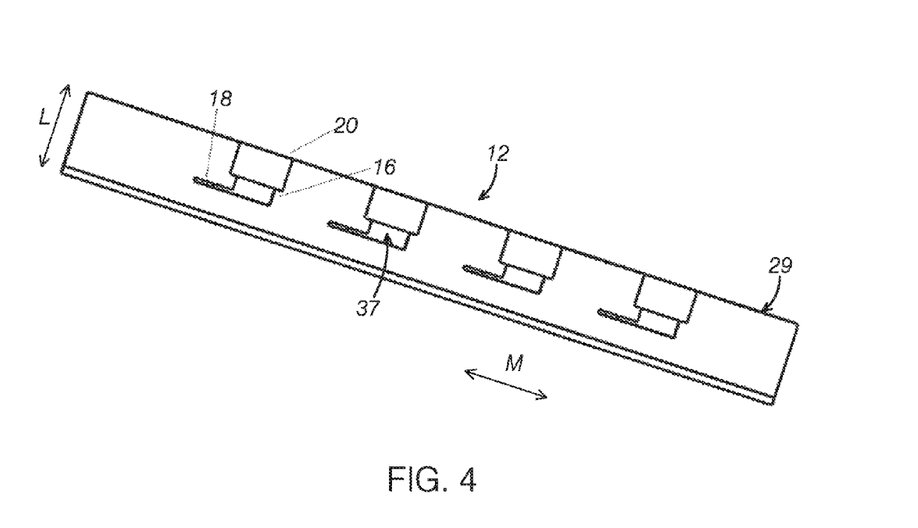
FIG. 4 is a side view of the base depicted in FIG. 3.
Figure 9:
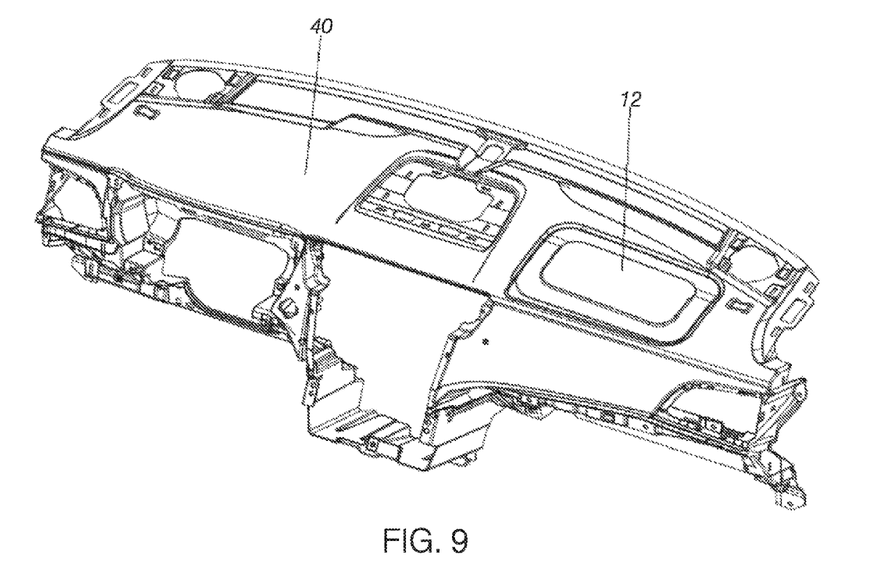
FIG. 9 is a schematic diagram of an airbag assembly installed on an instrument board.

Referring to FIGS. 3, 4 and with further reference to FIGS. 1 and 2, the base 12 may include a base plate 27, a first slot wall 29 and a second slot wall 31 extending from the base plate 27 and substantially parallel each other. In some embodiments, the base 12 may further include a third wall 33 and a fourth wall 35. The base 12 may be configured to receive the housing 14. The base 12 and the housing 14 together define a space to receive an airbag and associated devices. The first slot wall 29 may include a first slot 16 extending along a first direction L and a second slot 18 extending from the first slot and along with a second direction M different with the first direction. The first direction L may be the insertion direction of the housing 14. In some embodiments, the first slot 16 and the second slot 18 may form a L-shape. In some embodiments, the first slot 16 and the second slot 18 may form a 90 degree angle. It should be understood that the first slot 16 and the second slot 18 may be formed of an angle greater or less than 90 degree depending on the configuration of the first and/or second connection parts 26, 36. The first slot 16 further includes an open end 20 to allow the first connection part 26 move into the first slot 16. With further reference to FIG. 9, as an unlimited embodiment, the base 12 is shown as a safety airbag chute. As known in the technical field, the base plate 27 may include a weaken area which can be opened for the airbag deployment when the airbag is activated.

Referring FIGS. 1-3, during assembling of the safety airbag assembly 10, the first connection part 26 and the second connection part 36 of the housing 16 are aligned with the first slot 16 of the base 12, and then the first connection part 26 is inserted into the first slot 16 along the first direction L through the open end 2 to insert the housing 14 into the base 12.

Next, the first connection part 26 is moved into the second slot 18. The assembling of the housing 14 and the base 12 is completed when the first connection part 26 is moved into the second slot 18. A space is formed between the housing 14 and the base 12 to receive an airbag and associated devices.

At this position, the second slot 18 may function as a stop to obstruct the first connection part 26 from moving along the first direction L, since the extension direction M of the second slot 18 is different from the extension direction L of the first slot 16, the second slot 18 can stop the movement of the first connection part 26 at the first direction L, and thus the housing 14 cannot be directly detached from the base 12 along the first direction L. During a process of disassembling the housing 14, the first connection part 26 is slid to the first slot 16 from the second slot 18, and the first connection part 26 and the second connection part 36 are released from the open end 20, and thus the base 12 can be removed from the housing 14.

The airbag assembly 10 is easier to assemble and disassemble compared to the current technologies, and thus time saving can be achieved as well. Further, the gap between the base 12 and the housing 14 of the airbag assembly 10 can be minimized, therefore the noise from the vehicle bumping motion can be minimized.

In some embodiments, the second direction M may be substantially perpendicular with the first direction as shown in FIG. 4. In other embodiments, there may be any suitable angle between the two directions, as long as the first connection part 26 of the housing 14 can be moved along with the first slot 16 and slid into the second slot 18 without interference.

For the embodiments described above, there are no force needed to apply to any parts of the base 12 and the housing 14 to create deformation during a process of assembling and disassembling. Instead, the movements of the housing 14 in two different directions relative to the base 12 or the movements of the base 12 relative to the housing are needed during the assembling and disassembly processes. Thus, there is no wearing or damage or less wearing or damage on the base 12 and the housing 14.

The advantages of the airbag assembly 10 will be further described. The airbag assembly 10 includes the first and second connection parts 26, 36 on the first sidewall 15 and the first and second slots 16, 18 on the first slot wall 29. The housing 14 of the airbag assembly 10 includes a second connection part 36 extending from the first connection part 26 and opposite to the outer surface of the first sidewall 15 of the first connection part. During the deployment of an airbag, the airbag module held in the housing 14 will pop out from the base 12, which will produce a greater inflation force on the base 12 and thus the airbag will push the base 12 along a width direction W. The force applied to the base 12 will result a deformation of the base 12 along with the width direction W. At an assembly position of the airbag assembly 10, the second connection part 36 of the housing 14 is disposed opposite to the first sidewall 15 of the housing 14 to form a receiving space between the second connection part 36 and the first sidewall 15 to receive the first slot wall 29 of the base, such that the slot wall 29 of the base 12 is firmly held in the receiving space. Thus, when the airbag is deployed, the deformation of the base 12 along the width direction W is reduced due to the second connection part 36. Further the airbag can be guided to deployed at a desired direction. Furthermore, the second connection part 36 can make the connection between the base 12 and the housing 14 more robust. In addition, at the assembly position, the second connection part 36 can sandwich the slot wall 29 of the base 12 between the second connection part 36 and the first sidewall 15 of the housing 14 to prevent the assembly from shaking or moving laterally in the direction W. Furthermore, in some embodiments, the second connection part 36 and the first sidewall 15 may be configured to conform or contact an outer wall and an inner wall of the base 12 to further ensure stability of the housing 14 in installation.

According to one embodiment, the first slot 16 and the second slot 18 may be through slots passing the first sidewall 15, such as forming an open and continuous cut on the base 12, as shown FIG. 4. In some embodiments, the first slot 16 and second slot 18 may not be through slots. In some embodiment, the two slots may be formed in any angle that allows the first connection part 26 and the second connection part 36 of the housing 14 moving through smoothly.

As shown in FIG. 2A-2B, in one embodiment, the second connection part 36 extends up from the first connection part 26 along with the first direction L. It should be understood that the second connection part 36 may extend up or down from the first connection part 26 along the first direction L, but also may extend both up and down from the first connection part 26 along the first direction L. In some embodiment the first sidewall 15 may only include the first connection part 26 extending at the second direction M.

Furthermore, it should be understood that when the second connection 36 extends both up and down, a length of an upper portion and a length of a lower portion may be same or different. The length of the second connection part 36 at the first direction L may be greater than a length of the second slot 18 at the first direction L. In some embodiments, the length of the second connection part 36 at the first direction also may be less than the length of the second slot 18 at the first direction L.

As shown in FIGS. 3 and 4, the base 12 may be configured to have a surrounding wall 38 crossing the two sides of the first slot 16. In the depicted embodiment, the surrounding wall 38 may form an encircled space S in which the first connection part 26 and the second connection part 36 can pass through the first slot 16. Advantageously the surrounding wall 38 disposed on the base 12 may enhance the strength of the base 12 such that the base 12 will not deform or deform less under a pressure. The surrounding wall 38 can also provide a space for the first connection part 26 and the second connection part 36 of the housing 14 to move in and out and further guide their movement. Furthermore, during the deployment of the airbag, the surrounding wall 38 can prevent the sidewalls of the base 12 from breaking along the first direction L due to a force of the airbag deployment, which further enhances stability and robustness of the airbag assembly 10, and further guides the airbag's deployment direction.

In some embodiments, the base 12 and the surrounding wall 38 may be formed integrally. When the base 12 is molded as one piece with the surrounding wall 38, there is no extra processing needed and thus simplifies a manufacturing and installation.

In some embodiments, the base 12 and the surrounding wall 38 may be manufactured separately. For example, connection via insertion or snap fit may be used to connect the surrounding wall 38 and the base 12.

According to one embodiment, the first connection part 26 and the second slot 18 may be coupled or connected via a transition fit. In other words, a portion of the first connection part 26 in the second slot 18 may be coupled with the second slot 18 via the transition fit.

In some embodiments, a portion of the first connection part 26 in the second slot 18 and the second slot 18 may also be clearance fit or an interference fit. In other words, when the first connection part 26 is clearance fit with the second slot 28, there may be a clearance between the portion of the first connection part 26 in the second slot 18 and the second slot 18 to facilitate assembling and disassembling of the two parts. When the first connection part 26 and the second slot 18 are interference fit, the size for the portion of the first connection 26 in the second slot 18 is slightly greater than the size of the second slot 18, therefore, the connection of the housing 14 with the base 12 is more stable to preventing or reducing shaking or noising after assembling is completed.

Figure 5:
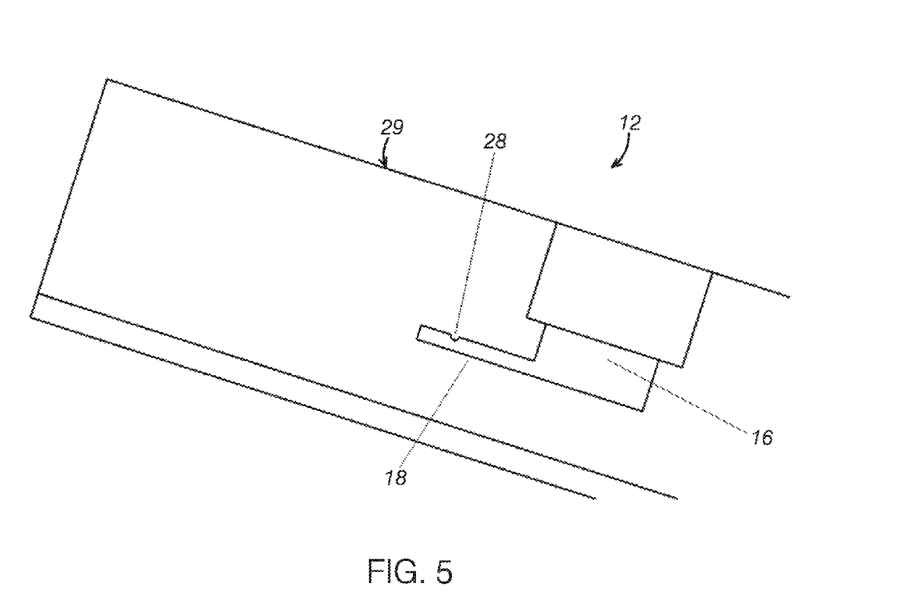
FIG. 5 is a partial enlarged view of a base of an airbag assembly according to one embodiment of the present disclosure.
Figure 6:
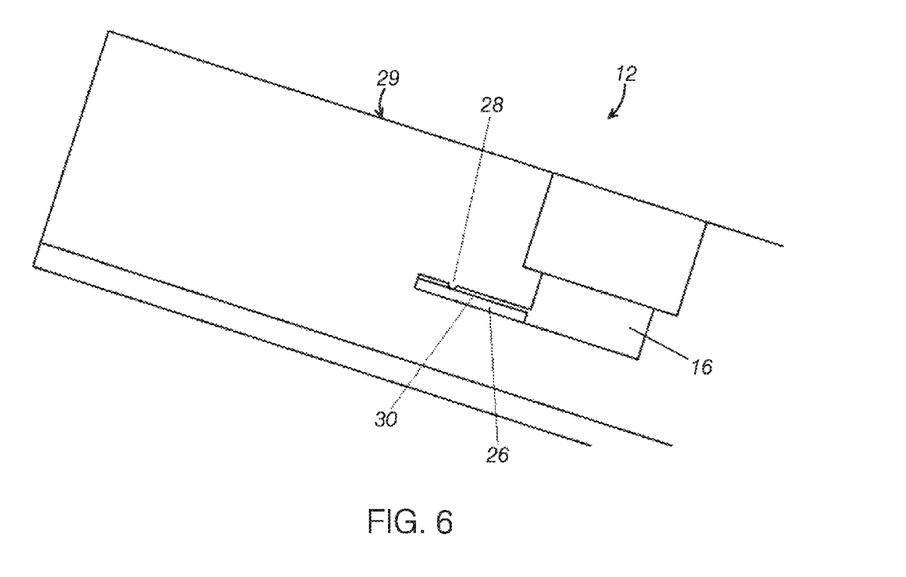
FIG. 6 is a partial enlarged view of a base of an airbag assembly depicted in FIG. 5, illustration connection of a first connection part and a second slot of the airbag assembly.

As shown in FIGS. 5 and 6, in some embodiments, a protrusion 28 may be formed on an inner surface define the second slot 18 and configured to contact a surface 30 of the first connection part 26. In this embodiment, when the first connection part 26 is slid through the first slot 16 and is positioned at the final assemble position of the second slot 18, the protrusion 28 contacts the surface 30 of the first connection part 26, while another surface of the first connection part 26 opposite to the surface 30 is biased against another surface of the second slot 18 to prevent the base 12 and the housing 14 from shaking after completed assembly, and further avoiding the housing 14 from falling off or avoid generating noise due to bumping during the vehicle operation.

It should be understood that the protrusion 28 may contact any surface of the first connection part 26, such as an upper surface or a lower surface. In other embodiments, the second slot 18 may include a plurality of protrusions 28 to contact the upper and lower surfaces of the first connection 26.

Figure 7:
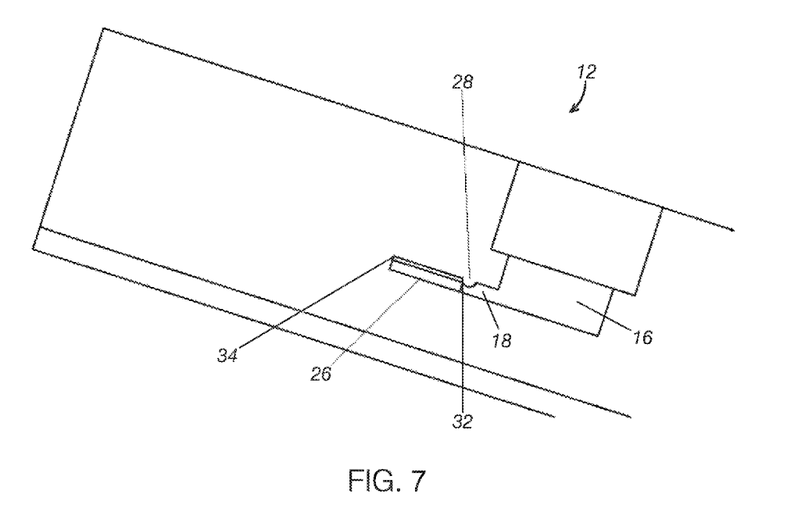
FIG. 7 is a partial enlarged view of a base of an airbag assembly according to another embodiment of the present disclosure.

As shown in FIG. 7, according to another embodiment, the second slot 18 may include a protrusion 28 to sandwich the first connection part 26 between an inner end 34 of the second slot 18 and the protrusion 28 or the first connection part 26 is interposed between the inner end 34 and the protrusion 28. In other words, when the first connection 26 is slid though the first slot 16 and second slot 18 and is positioned at the final assemble position, the protrusion 28 presses an end 32 of the first connection part 26, and the end 34 of the second slot 28 contacts another end of the first connection part 26. That is, the protrusion 28 and the end 34 of the second slot 18 sandwich the first connection part 26 to secure the first connection part 26 firmly and to prevent it from shaking or falling off.

It should be understood that, the protrusion 28 may be any shape having a length at the second direction M to presses any surface of the first connection part 26 to ensure a secured connection between the housing 14 and the base 12.

Figure 8:
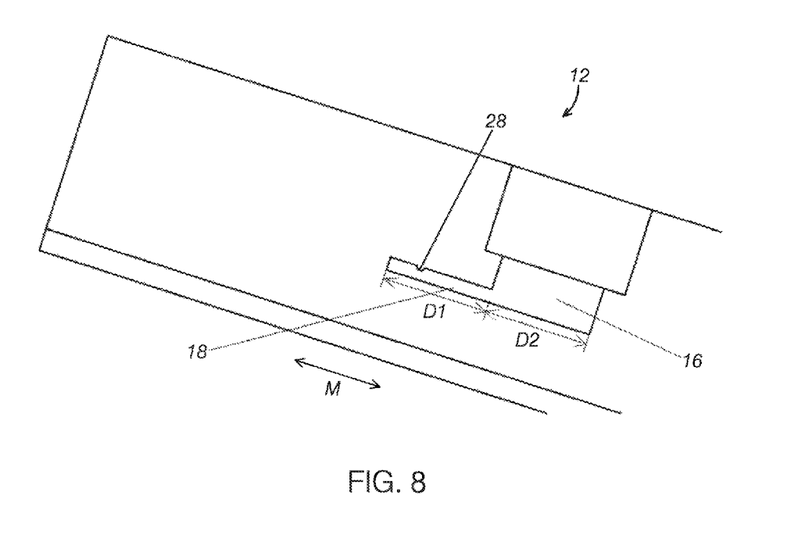
FIG. 8 is a partial enlarged view of base of an airbag assembly according to another embodiment of the present disclosure.

As shown in FIG. 8, a length D1 of the second slot 18 at the second direction M is greater or equal a distance D2 of two sidewalls defining the first slot 16. That is, the length D1 of the second slot 18 at second direction M is greater than a width of the first connection part 26 at second direction M. In this way, the second slot 18 may receive an entire first connection part 26 for a secured connection.

As shown in FIG. 9, the base 12 may be configured as a portion of an instrumental panel 40, such as an airbag chute. It should be understood, beside the position as shown in FIG. 9, that the airbag assembly 10 may be disposed at any suitable position in a vehicle.

In some embodiments, the housing 14 may include metal material and the base 12 may include plastic. As such, the metal housing 14 and the first connection part 26 and second connection part 36 will not be deformed easily due to squeeze or expansion, when the airbag is deployed, and thus prevent the housing 14 to press on the base 12, and to guide the base 12 opened at a desired direction. In addition, the base made from plastic can lower the manufacturing cost, and provide a better appearance consistent with other interior trims in a vehicle.

Additionally, it should be understood that beside the airbag assembly, the housing 14 and base 12 of this present disclosure may be applicable to other parts of the vehicle, such as engine assemblies, air condition system.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into computer readable storage medium in the engine control system.

It will be appreciated that the configurations and routines disclosed herein are exemplary in nature, and that these specific embodiments are not to be considered in a limiting sense, because numerous variations are possible.

The following claims particularly point out certain combinations and subcombinations regarded as novel and non-obvious. These claims may refer to "an" element or "a first" element or the equivalent thereof such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An airbag assembly in a vehicle, comprising:
a housing, wherein the housing includes a first connection part protruding from an outer wall of the housing and a second connection part extending from a distal end of the first connection part and a main surface of the second connection part faces to the outer wall; and
a base including a base plate and a slot wall, wherein the slot wall extends from the base plate and forms an angle with the base plate, wherein the slot wall includes a first slot extending in a first direction and a second slot extending from the first slot at a second direction different from the first direction, and wherein the first slot opens to an edge portion of the slot wall to allow the first and second connection parts of the housing to pass through the first slot in the first direction from the edge portion;
wherein the housing is connected with the base when first connection part is received in the second slot.

2. The airbag assembly of claim 1, wherein the second connection part extends from the first connection part at the first direction.

3. The airbag assembly of claim 1, wherein the base includes a surrounding wall across opposite ends of the first slot.

4. The airbag assembly of claim 3, wherein the base and the surrounding walls are formed integrally.

5. The airbag assembly of claim 1, wherein the first connection part is coupled to the second slot via transition fit.

6. The airbag assembly of claim 1, wherein the second slot includes a protrusion to contact a surface of the first connection part.

7. The airbag assembly of claim 1, wherein the second slot includes a protrusion to sandwich the first connection part between the protrusion and an end of the second slot.

8. The airbag assembly of claim 1, wherein a length of the second slot is greater than or equal to a distance between two opposite ends of the first slot.

9. The airbag of claim 1, wherein the base is configured to be at least a portion of an instrumental panel of the vehicle.

10. The airbag assembly of claim 1, wherein the housing includes metal material and the base includes plastic.

11. An airbag assembly in a vehicle, comprising:
a housing including a first sidewall and at least one first connection part extending from an outer surface of the first sidewall and substantially perpendicular to the outer surface; and
a base including a base plate and a first slot wall, wherein the first slot wall extends from the base plate, substantially parallel to the first sidewall of the housing at an assemble position and wherein the first slot wall includes a L-shaped slot having a first slot and a second slot,
wherein the first slot opens to an edge portion of the first slot wall and is configured to allow the first connection part of the housing to slide along a first direction and then move to the second slot during an assembling, wherein the first direction is substantially parallel to the first slot wall and pointed from the edge portion of the slot wall to the base plate, and wherein the housing is connected to the base when the first connection part is received in the second slot after passing through the first slot.

12. The airbag assembly of claim 11, wherein the housing further includes a second connection part disposed at a distal end of the first connection part and extending from the first connection part and facing the first sidewall and wherein the distal end is spaced away from the first slot wall and a main surface of the second connection part is substantially parallel to the first slot wall.

13. The airbag assembly of claim 12, wherein the housing further includes a second sidewall opposite to the first sidewall and the base further includes a second slot wall opposite to the first slot wall, wherein the housing includes a plurality of first and second connection parts on the first sidewall and the second sidewall, respectively, and wherein the base includes a plurality first and second slots corresponding to the plurality of first and second connection parts on the first slot wall and the second slot wall, respectively.

14. The airbag assembly of claim 11, wherein the second slot is configured to enable transition fit, clearance fit or interference fit between the first connection part and the second slot.

15. The airbag assembly of claim 12, wherein the base further includes a surrounding wall extending from an outer surface of the first sidewall and enclosing the first slot partially, and configured to allow the first and second connection parts to pass through.

16. The airbag assembly of claim 12, wherein an inner wall of the second slot includes a protrusion to restrict movement of the first connection part once the first connection part is received in the second slot.

17. An airbag assembly in a vehicle, comprising:
a housing, wherein the housing includes a first sidewall and a second sidewall opposite each other, each of the first and second sidewall include a first connection part extending from an outer surface of the first and second sidewalls, respectively and substantially perpendicular to the outer surface and a second connection part extending from a distal end of the first connection part, and a main surface of the second connection part is substantially parallel to the outer surface, and wherein the distal end is spaced apart from the first sidewall or the second sidewall; and
a base including a base plate and a first slot wall and a second slot wall, wherein the first and second slot walls extend from the base plate, and define an opening to receive the first and second sidewalls of the housing, and wherein the first and second slot walls include a L-shaped slot having a first slot and a second slot,
wherein the first slot extends to an edge portion of the first slot wall or the second slot wall and is configured to allow the first connection part of the housing to pass through at a direction substantially parallel to the first and second slot walls during an assembly process and a disassembly process, wherein the housing is connected to the base when the first connection part is received in the second slot after passing through the first slot, and wherein the housing and the base define a space to receive an airbag and associated devices.

18. The airbag assembly of claim 17, wherein an inside wall of the second slot includes a protrusion to contact the first connection part to secure the first connection part in the second slot.

19. The airbag assembly of claim 17, the first and second sidewalls of the housing include a plurality of first connection parts and the first and second slot walls include a plurality of corresponding L-shaped slot.

* * * * *